United States Patent [19]

Sewerinson et al.

[11] Patent Number: 4,613,976
[45] Date of Patent: Sep. 23, 1986

[54] CONSTANT ENVELOPE OFFSET QPSK MODULATOR

[75] Inventors: Ake Sewerinson, Port Coquitlam; Andrew V. Hellquist, Burnaby, both of Canada

[73] Assignee: British Columbia Telephone Company, Burnaby, Canada

[21] Appl. No.: 606,427

[22] Filed: May 2, 1984

[51] Int. Cl.$^4$ ............................................. H04L 27/18
[52] U.S. Cl. .................... 375/52; 332/16 R; 332/23 R
[58] Field of Search ............... 375/52, 53, 67, 9, 46; 332/9 R, 9 T, 16 R, 16 T, 21, 23 R; 455/615

[56] References Cited

U.S. PATENT DOCUMENTS

| | | | |
|---|---|---|---|
| 3,643,023 | 2/1972 | Ragsdale et al. | 375/53 |
| 3,916,101 | 10/1975 | Bertin et al. | 375/53 |
| 4,008,373 | 2/1977 | Nash et al. | 375/53 |
| 4,168,397 | 9/1979 | Bradley | 375/53 |
| 4,229,821 | 10/1980 | De Jager et al. | 375/53 |
| 4,417,219 | 11/1983 | Brossard et al. | 375/53 |
| 4,504,802 | 3/1985 | Heatherington | 375/52 |

OTHER PUBLICATIONS

Kato et al, "Cross-Correlated Phase Shift Keying System with Improved Envelope Fluctuation", 1982, IEEE Proceeding on Comm., pp. 2E.11–2E.15.

Feher et al, "New Modulation Techniques for Low Cost Power and Bandwidth Efficient Satellite Earth Stations", IEEE Transaction on Communication, vol. COM-30, No. 1, Jan. 82, pp. 275–283.

De Jager et al, "Tamed Frequency Modulation, A Novel Method to Achieve Spectrum Economy in Digital Transmission", IEEE Transaction on Communication, vol. COM-26, No. 5, May 1978, pp. 534–542.

D. Muilwijk, "Correlative Phase Shift Keying a Class of Constant Envelope Modulation Techniques", IEEE Transaction on Communication, vol. COM 29, Mar. 1981, pp. 226–236.

C. Dekker, "The Application of Tamed Frequency Modulation to Digital Transmission Via Radio", 1979 IEEE NTC, 1979, pp. 55.3.1–55.3.7.

D. Muilwijk, J. Noordanus, "Digital Phase Modulation Method Giving a Band-Limited Spectrum for Satellite Communication", American Institute of Aeroautics and Astronautics, 1980, pp. 391–398.

Primary Examiner—Robert L. Griffin
Assistant Examiner—Stephen Chin
Attorney, Agent, or Firm—Russell A. Cannon

[57] ABSTRACT

The modulator comprises a serial to parallel converter which separates alternate bits of a serial-binary data stream into I and Q bit streams that are stored in associated shift registers, a pair of ROMs that drive associated D/A converters, and a quadrature-phase modulator. Each bit of the I and Q bit streams has a duration of 2T, where T is the bit interval or period of a data bit. Each of the ROMs comprises blocks of memory that contain a plurality of digital words. The present and immediate past I and Q bits in the shift registers, and a baud clock signal of one-half the data signal rate, are applied to address inputs of the ROMs for selecting associated memory blocks in the 2 ROMs. A counter then clocks the ROMs for sequentially outputting the contents of the addressed memory blocks to the converters which produce analog voltages that phase modulate a carrier signal for moving a resultant signal vector with a constant envelope during each bit interval. The contents of the ROMs are selected to provide a substantially constant amplitude vector whose rate of change w of phase satisfies the criteria:

| $I(t) = I(t - 2T)$ | $Q(t) = Q(t - 2T)$ | $|w|$ |
|---|---|---|
| yes | yes | 0 |
| yes | no | W |
| no | yes | W |
| no | no | 2W | where W and 2W are constant phase velocities that rotate the signal vector a total of 45° and 90°, respectively, in a bit or symbol interval.

9 Claims, 11 Drawing Figures

FIG. 1

| I(t) | I(t-2T) | Q(t) | Q(t-2T) | Baud Clock | Phase Rotation (Degrees) From — To | Phase Change Δφ° | Rate of Change of Phase |
|---|---|---|---|---|---|---|---|
| 0 | 0 | 0 | 0 | 0 | 225 — 225 | 0 | 0 |
| 0 | 0 | 0 | 0 | 1 | 225 — 225 | 0 | 0 |
| 0 | 0 | 0 | 1 | 0 | 135 — 180 | +45 | +45°/T |
| 0 | 0 | 0 | 1 | 1 | 180 — 225 | +45 | +45°/T |
| 0 | 0 | 1 | 0 | 0 | 225 — 180 | −45 | −45°/T |
| 0 | 0 | 1 | 0 | 1 | 180 — 135 | −45 | −45°/T |
| 0 | 0 | 1 | 1 | 0 | 135 — 135 | 0 | 0 |
| 0 | 0 | 1 | 1 | 1 | 135 — 135 | 0 | 0 |
| 0 | 1 | 0 | 0 | 0 | 270 — 225 | −45 | −45°/T |
| 0 | 1 | 0 | 0 | 1 | 315 — 270 | −45 | −45°/T |
| 0 | 1 | 0 | 1 | 0 | 90 — 180 | +90 | +90°/T |
| 0 | 1 | 0 | 1 | 1 | 360 — 270 | −90 | −90°/T |
| 0 | 1 | 1 | 0 | 0 | 270 — 180 | −90 | −90°/T |
| 0 | 1 | 1 | 0 | 1 | 0 — 90 | +90 | +90°/T |
| 0 | 1 | 1 | 1 | 0 | 90 — 135 | +45 | +45°/T |
| 0 | 1 | 1 | 1 | 1 | 45 — 90 | +45 | +45°/T |
| 1 | 0 | 0 | 0 | 0 | 270 — 315 | +45 | +45°/T |
| 1 | 0 | 0 | 0 | 1 | 225 — 270 | +45 | +45°/T |
| 1 | 0 | 0 | 1 | 0 | 180 — 270 | −90 | −90°/T |
| 1 | 0 | 0 | 1 | 1 | 270 — 360 | +90 | +90°/T |
| 1 | 0 | 1 | 0 | 0 | 180 — 90 | +90 | +90°/T |
| 1 | 0 | 1 | 0 | 1 | 90 — 45 | −90 | −90°/T |
| 1 | 0 | 1 | 1 | 0 | 135 — 90 | −45 | −45°/T |
| 1 | 0 | 1 | 1 | 1 | 315 — 315 | −45 | −45°/T |
| 1 | 1 | 0 | 0 | 0 | 315 — 315 | 0 | 0 |
| 1 | 1 | 0 | 0 | 1 | 45 — 0 | 0 | 0 |
| 1 | 1 | 0 | 1 | 0 | 360 — 315 | −45 | −45°/T |
| 1 | 1 | 0 | 1 | 1 | 315 — 360 | −45 | −45°/T |
| 1 | 1 | 1 | 0 | 0 | 0 — 45 | +45 | +45°/T |
| 1 | 1 | 1 | 0 | 1 | 45 — 45 | +45 | +45°/T |
| 1 | 1 | 1 | 1 | 0 | 45 — 45 | 0 | 0 |
| 1 | 1 | 1 | 1 | 1 | 45 — 45 | 0 | 0 |

| MEMORY BLOCK | I(t) | I(t-2T) | Q(t) | Q(t-2T) | BC | ADDRESS BLOCKS (Memory Locations) |
|---|---|---|---|---|---|---|
| B1  | 0 | 0 | 0 | 0 | 0 | 00  – 1F   |
| B2  | 0 | 0 | 0 | 0 | 1 | 20  – 3F   |
| B3  | 0 | 0 | 0 | 1 | 0 | 200 – 21F  |
| B4  | 0 | 0 | 0 | 1 | 1 | 220 – 23F  |
| B5  | 0 | 0 | 1 | 0 | 0 | 100 – 11F  |
| B6  | 0 | 0 | 1 | 0 | 1 | 120 – 13F  |
| B7  | 0 | 0 | 1 | 1 | 0 | 300 – 31F  |
| B8  | 0 | 0 | 1 | 1 | 1 | 320 – 33F  |
| B9  | 0 | 1 | 0 | 0 | 0 | 80  – 9F   |
| B10 | 0 | 1 | 0 | 0 | 1 | A0  – BF   |
| B11 | 0 | 1 | 0 | 1 | 0 | 280 – 29F  |
| B12 | 0 | 1 | 0 | 1 | 1 | 2A0 – 2BF  |
| B13 | 0 | 1 | 1 | 0 | 0 | 180 – 19F  |
| B14 | 0 | 1 | 1 | 0 | 1 | 1A0 – 1BF  |
| B15 | 0 | 1 | 1 | 1 | 0 | 380 – 39F  |
| B16 | 0 | 1 | 1 | 1 | 1 | 3A0 – 3BF  |
| B17 | 1 | 0 | 0 | 0 | 0 | 40  – 5F   |
| B18 | 1 | 0 | 0 | 0 | 1 | 60  – 7F   |
| B19 | 1 | 0 | 0 | 1 | 0 | 240 – 25F  |
| B20 | 1 | 0 | 0 | 1 | 1 | 260 – 27F  |
| B21 | 1 | 0 | 1 | 0 | 0 | 140 – 15F  |
| B22 | 1 | 0 | 1 | 0 | 1 | 160 – 17F  |
| B23 | 1 | 0 | 1 | 1 | 0 | 340 – 35F  |
| B24 | 1 | 0 | 1 | 1 | 1 | 360 – 37F  |
| B25 | 1 | 1 | 0 | 0 | 0 | C0  – DF   |
| B26 | 1 | 1 | 0 | 0 | 1 | E0  – FF   |
| B27 | 1 | 1 | 0 | 1 | 0 | 2C0 – 2DF  |
| B28 | 1 | 1 | 0 | 1 | 1 | 2E0 – 2FF  |
| B29 | 1 | 1 | 1 | 0 | 0 | 1C0 – 1DF  |
| B30 | 1 | 1 | 1 | 0 | 1 | 1E0 – 1FF  |
| B31 | 1 | 1 | 1 | 1 | 0 | 3C0 – 3DF  |
| B32 | 1 | 1 | 1 | 1 | 1 | 3E0 – 3FF  |

| Address of Memory Location (Line 36) | Memory Block B17 I-Channel HEX. (Line 23) | Memory Block B17 I-Channel Amp. (Line 27) | Memory Block B17 Q-Channel HEX. (Line 24) | Memory Block B17 Q-Channel Amp. (Line 28) | Designated Phase (Degrees) (Phasor 30) |
|---|---|---|---|---|---|
| 0040 | 80 | 0.02 | 00 | -1.00 | 271 |
| 0041 | 84 | 0.05 | 00 | -1.00 | 273 |
| 0042 | 88 | 0.08 | 00 | -1.00 | 275 |
| 0043 | 8C | 0.11 | 00 | -1.00 | 276 |
| 0044 | 90 | 0.14 | 00 | -1.00 | 278 |
| 0045 | 94 | 0.17 | 00 | -1.00 | 280 |
| 0046 | Not Used | | Not Used | | |
| 0047 | Not Used | | Not Used | | |
| 0048 | 98 | 0.21 | 04 | -0.97 | 282 |
| 0049 | 9C | 0.24 | 04 | -0.97 | 284 |
| 004A | A0 | 0.27 | 04 | -0.97 | 286 |
| 004B | A4 | 0.30 | 04 | -0.97 | 287 |
| 004C | A8 | 0.33 | 08 | -0.94 | 289 |
| 004D | AC | 0.37 | 08 | -0.94 | 291 |
| 004E | Not Used | | Not Used | | |
| 004F | Not Used | | Not Used | | |
| 0050 | B0 | 0.40 | 08 | -0.94 | 293 |
| 0051 | B4 | 0.43 | 0C | -0.90 | 296 |
| 0052 | B8 | 0.46 | 0C | -0.90 | 296 |
| 0053 | BC | 0.49 | 10 | -0.87 | 298 |
| 0054 | C0 | 0.52 | 10 | -0.87 | 299 |
| 0055 | | | 14 | -0.84 | 302 |
| 0056 | Not Used | | Not Used | | |
| 0057 | Not Used | | Not Used | | |
| 0058 | C4 | 0.56 | 14 | -0.84 | 304 |
| 0059 | C8 | 0.59 | 18 | -0.81 | 306 |
| 005A | CC | 0.62 | 1C | -0.78 | 308 |
| 005B | CC | 0.62 | 1C | -0.78 | 308 |
| 005C | D0 | 0.65 | 20 | -0.75 | 311 |
| 005D | D4 | 0.68 | 24 | -0.71 | 314 |
| 005E | Not Used | | Not Used | | |
| 005F | Not Used | | Not Used | | |

CONSTANT ENVELOPE OFFSET QPSK MODULATOR

BACKGROUND OF INVENTION

This invention relates to method and apparatus for converting a data signal into an offset quadrature-phase shift keying (OQPSK) signal for transmission, and more particularly to improved method and apparatus for producing a QPSK modulated signal having a substantially constant amplitude and continuous phase.

Factors that must be considered in selecting a modulation method for transmitting digital information in a satellite communication system include transmit power requirements, spectral efficiency, transmission channel non-linearities, and the complexity of hardware required for implementation. In particular, the frequency spectrum associated with the modulation method must fit within certain constraints. If the communication system uses frequency division multiplex techniques with a channel spacing of 1/T, where T is the symbol interval and the reciprocal thereof is equivalent to a full QPSK mainlobe, any energy out of this frequency range causes adjacent channel interference. QPSK sidelobes can be removed through filtering either pre—or post——output amplification. Power requirements and cost considerations normally make it desirable to employ amplifiers that operate at or near saturation. The choice of pre—or—post-amplification filtering is influenced by the following factors:

post-amplification filtering allows the use of saturated amplifiers without distortion and is often used with wideband transmission. For narrow band or frequency agile applications the complexity of the filter is often prohibitive.

pre-amplification filtering allows for simple spectrum shaping, but does simultaneously introduce signal envelope fluctuations. Non-linearities introduced by an amplifier will reduce these envelope fluctuations and may result in spectral spreading by restoration of sidelobes, which can cause adjacent channel interference and increase the bit error rate.

Hence, some type of PSK modulation with reduced spectral sidelobes and without envelope amplitude variations is preferred. QPSK modulation providing a modulated signal having a constant amplitude and continuous phase is a particularly attractive type of modulation that may be used here. Published articles related to PSK and which are incorporated herein by reference, are:

(1) S. Kato, K. Feher, "Cross-Correlated Phase Shift Keying (XPSK) System With Improved Envelope Fluctuation", 1982 IEEE Proceedings on Communications, pages 2E.1.1-2E.1.5.

(2) K. Feher, T. Le-Ngoc, H. P. Van, "New Modulation Techniques for Low Cost Power and Bandwidth Efficient Satellite Earth Stations", IEEE Transactions on Communications, Vol. Com-30, No. 1, Jan. 1982, pages 275-283.

(3) F. deJager, C. Dekker, "Tamed Frequency Modulation, A Novel Method to Achieve Spectrum Economy in Digital Transmission", IEEE Transactions on Communications, Vol. Com-26, No. 5, May 1978, pages 534-542.

(4) F. de Jager, C. Dekker, D. Muilwijk, "System for Data Transmission by Means of An Angle-Modulated Carrier of Constant Amplitude", U.S. Pat. No. 4,229,821, issued Oct. 21, 1980.

(5) D. Muilwijk, "Correlative Phase Shift Keying-a Class of Constant Envelope Modulation Techniques", IEEE Transactions on Communications, Vol. COM 29, March 1981, pages 226-236.

(6) C. Dekker, "The Application of Tamed Frequency Modulation to Digital Transmission Via Radio", 1979 IEEE, NTC 1979, pages 55.3.1-55.3.7.

(7) D. Muilwijk, J. Noordanus, "Digital Phase Modulation Methods Giving a Band-Limited Spectrum for Satellite Communications", American Institute of Aeronautics and Astronautics, 1980, pages 391-398.

In QPSK modulation, the modulator is preferably arranged for generating an angle modulated carrier signal or vector, of substantially constant amplitude and continuous phase in each symbol interval of length T, said phase being determined by a set of rules. In such a QPSK modulation system an input data signal may be broken into in-phase (I) and quadrature-phase (Q) pulse trains receiving odd and even numbered data bits, respectively. These pulse trains are used to establish the amplitude and phase of the signal vector. The magnitude of the signal vector is maintained substantially constant as the phase thereof varies in order to prevent spectrum spreading. The phase of the signal vector is also caused to be continuous for the same reason. In Ref. 1, a cross-correlated phase shift keying modem employs non-linear switching filters in producing the desired signal. The generation of hard-limited quadrature modulated signals and analysis thereof is discussed in Ref. 2. In the tamed frequency modulation scheme in Ref. 3 and the associated U.S. patent (Ref. 4), digital words that dictate the phase change are obtained from a pair of memories in accordance with particular code rules that require a plurality of successive data bits and information from a quadrant counter.

An object of this invention is the provision of an improved PSK modulation method and apparatus for producing angle modulated carrier signals or phasors of relatively constant amplitude and continuous phase.

SUMMARY OF THE INVENTION

In accordance with this invention, an improved method of generating a phase shift keying modulated signal vector from a digital input data signal in which alternate bits are directed into in-phase and quadrature-phase I and Q channels, with the current bit that is entered into each channel being held constant for the time interval 2T of the current and next data bits, and wherein the phase of the signal vector varies by prescribed amounts and in prescribed directions during the time or symbol interval T of each data bit, comprises the step of causing the rate of change w of phase to be determined as follows:

| I(t) = I(t − 2T) | Q(t) = Q(t − 2T) | \|w\| |
| --- | --- | --- |
| yes | yes | O |
| yes | no | W |
| no | yes | W |
| no | no | 2W | where w is the phase velocity or rate of change of phase, and W and 2W are constant phase velocities that will rotate the signal vector a total of 45° and 90°, respectively, in one bit time T.

DESCRIPTION OF PREFERRED EMBODIMENTS

Figure 1:
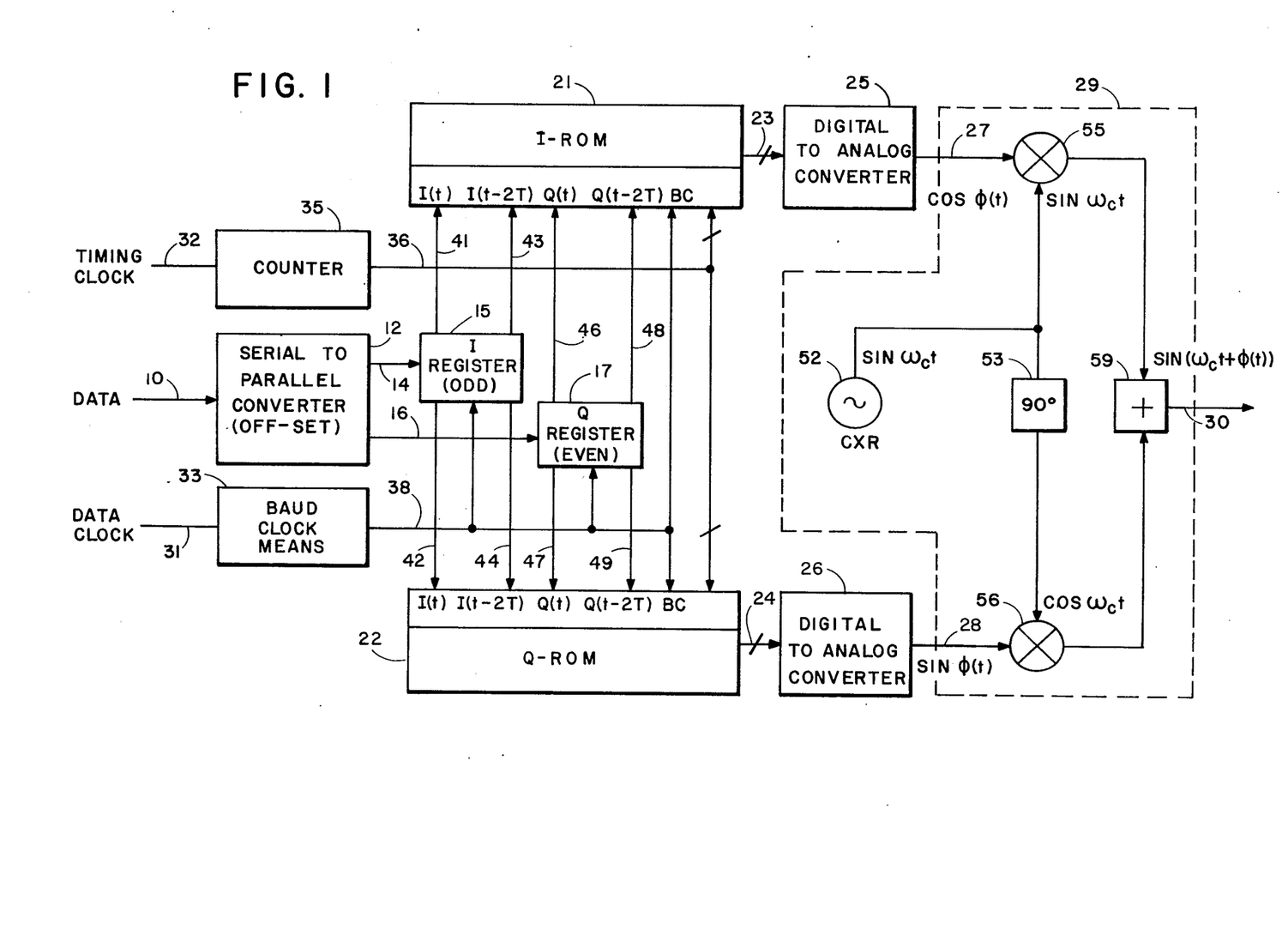
FIG. 1 is a block diagram of a preferred embodiment for practicing this invention.
Figure 2:
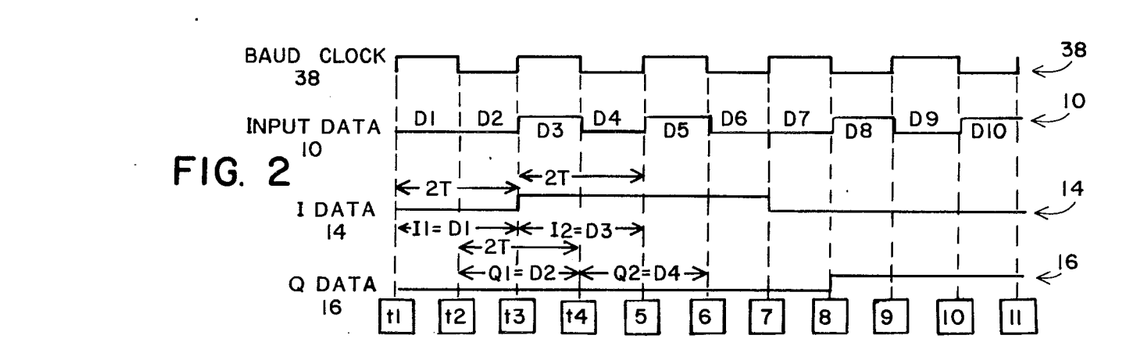
FIG. 2 is waveforms for a baud clock signal 38, a serial binary input data stream 10, and I and Q bit streams 14 and 16 that are derived from the input data stream.

Referring now to FIG. 1, a QPSK (quadrature-phase shift keying) modulator embodying this invention comprises a serial to parallel converter 12, a pair of shift registers 15 and 17, a pair of read-only memories (ROM) 21 and 22, a pair of digital to analog converters 25 and 26, and a quadrant modulator 29. The converter 12 receives an input data signal 10 from a data source (not shown) which also provides synchronous data clock pulses and clock timing pulses on lines 31 and 32. A clock means 33 is responsive to clock pulses on line 31 for producing baud clock pulses (see FIG. 2, waveform 38) having a repetition rate that is one-half that of the data clock pulses. An example of an input waveform is shown in FIG. 2, waveform 10. This data signal 10 may be differentially encoded prior to converter 12 or such encoding may be provided in the converter 12. In the following description, however, the data signal 10 is an unencoded binary data signal for simplification of illustration.

The converter 12 is a conventional serial to parallel converter which operates in a conventional manner for separating alternate bits in the input data stream into in-phase (I) and quadrature-phase (Q) data streams on lines 14 and 16 (see FIG. 2, waveforms 14 and 16). This operation causes the data signals 14 and 16 in the I and Q channels to be offset from each other by one bit interval T. More specifically, converter 12 directs odd numbered bits D1, D3, etc. into the I data stream 14 and even numbered bits D2, D4, etc. into the Q data stream 16 (while holding each data bit on the associated output line thereof constant during the subsequent baud interval of duration 2T). Stated differently, the I channel data signal is updated at times t1, t3, etc., with the I data level being held constant throughout the subsequent baud time of 2T. Similarly, the Q channel data signal is updated at times t2, t4, etc. with the Q data level being held constant throughout the subsequent baud time of 2T. Thus, the I data bit I1 is equal to D1 (which is a logic 0) throughout the baud time interval of 2T between t1 and t3. Similarly, the Q data bit Q1 is equal to D2 (which is a logic level 0) during the baud time interval of 2T between times t2–t4, even though the data bit D3 between times t3–t4 is now high.

The registers 15 and 17 may be serial shift registers which are clocked by baud clock pulses on line 38 (see FIG. 2, waveform 38). The present and immediate past I-data bits I(t) and I(t−2T) in register 15 are applied on output lines thereof to associated address inputs of the two ROMs. Similarly, the present and immediate past Q-data bits Q(t) and Q(t−2T) in register 17 are applied on output lines thereof to associated address inputs of the two ROMs. It is these present and past I and Q-data bits, together with the baud clock BC on line 38, which make up unique addresses of associated blocks of memory in the two ROMs (see FIG. 7) which contain information in look-up tables for causing a signal vector or phasor 30 on line 30 to move in a prescribed manner and at rates in accordance with a unique set of rules.

Briefly, there are only eight positions at which the signal vector 30 may reside at the end of a symbol interval. The end points of these allowable phasor positions are on a circle 62 of constant amplitude and have phases that are multiples of 45° with respect to the origin (see FIG. 5). Only four of these phasors (at ±45° and ±135°) are rest states where the phasor can remain throughout a symbol interval. Ideally the phasor 30 continuously moves along the circle 62 of constant amplitude, at prescribed rates and in prescribed directions during symbol intervals in accordance with the states of present and prior I and Q channel data bits. The I(t−2T) and Q(t−2T) signals essentially tell where the phasor was at the end of a symbol interval, and the I(t) and Q(t) signals essentially tell where the phasor is to move during the subsequent symbol interval T. The phasor may move ±45° from any n45° point, where n is an integer, in FIG. 5. The phasor may move ±90°, however, only from m45° points, where m is an even numbered integer (i.e., at 0°, ±90°, and 180°). Conversely, the phasor may stay at rest throughout a symbol interval only when the phasor is at p45°, where p is an odd numbered integer (i.e., at ±45° and ±135°). This means that at the start of any symbol interval only two things can happen during that symbol interval: the phasor can stay at rest or move 45°; alternatively, the phasor can move 45° or 90°.

In an embodiment of this invention that was built and operated the phasor moved at a constant rate during each symbol interval. The rules for specifying the direction and rate of phase change during each symbol interval are described more fully hereinafter. These rules and the allowable phase changes are tabulated in FIG. 4 as a function of the baud clock and current and past data bits in the I and Q channels.

Figure 7:
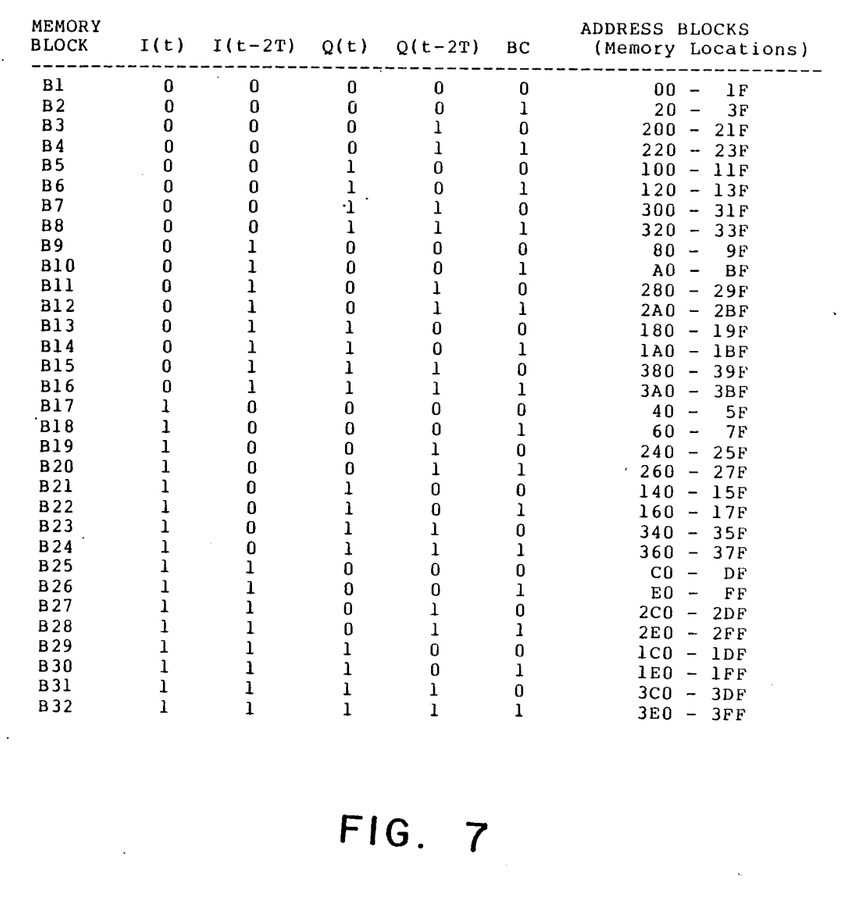
FIG. 7 is a listing of the memory locations in memory blocks of the ROMs.
Figure 8:
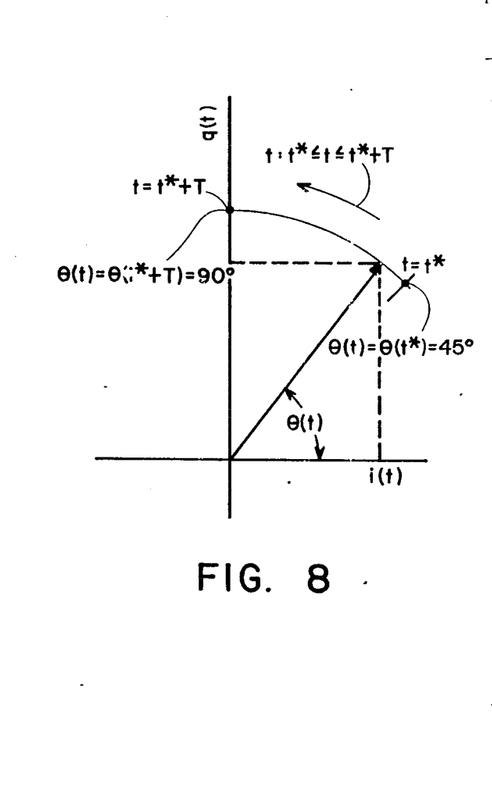
FIG. 8 is a phasor diagram illustrating phase angle change.

In order to accomplish any required phase change during a symbol interval, each of the ROMs is divided into 32 different blocks of memory (see FIG. 7). This corresponds to the number of different addresses that are defined by the five input signals to the ROMs (i.e., the baud clock and the present and past I and Q channel bits). Stated differently, there are 16 possible phase changes when the Q channel is most recently updated and 16 more for when the I channel is most recently updated. Thus, a block of ROM is used for each combination of input data, with each new I or Q-data bit causing a jump to a new memory block.

Considering the operation at an arbitrary time t6 in FIG. 2 where the Q channel is most recently updated (i.e., the baud clock is low) then BC=0, Q(t)=D6, Q(t−2T)=D4, I(t)=D5, and I(t−2T)=D3.

In order to treat data in the proper sequence D3, D4, D5, D6, the system must treat the channel bits as follows: I(t−2T), Q(t−2T), I(t) and Q(t). For the preceding symbol interval from time t5 in which the I channel is most recently updated (i.e., the baud clock is high), however, BC=1, I(t)=D5, I(t−2T)=D3, Q(t)=D4, and Q(t−2T)=D2. Thus, the correct data sequence now is found to be D2, D3, D4, D5. This means that the system must treat the I and Q channel bits here in a different order at time t5, i.e., Q(t−2T), I(t−2T), Q(t), and I(t), than at time t6. The baud clock indicates which of the I and Q channels was most recently updated and serves to resolve the ambiguity here. The manner in which the bits are considered is taken care of in the address units of the ROMs and the memory blocks.

Figure 5:
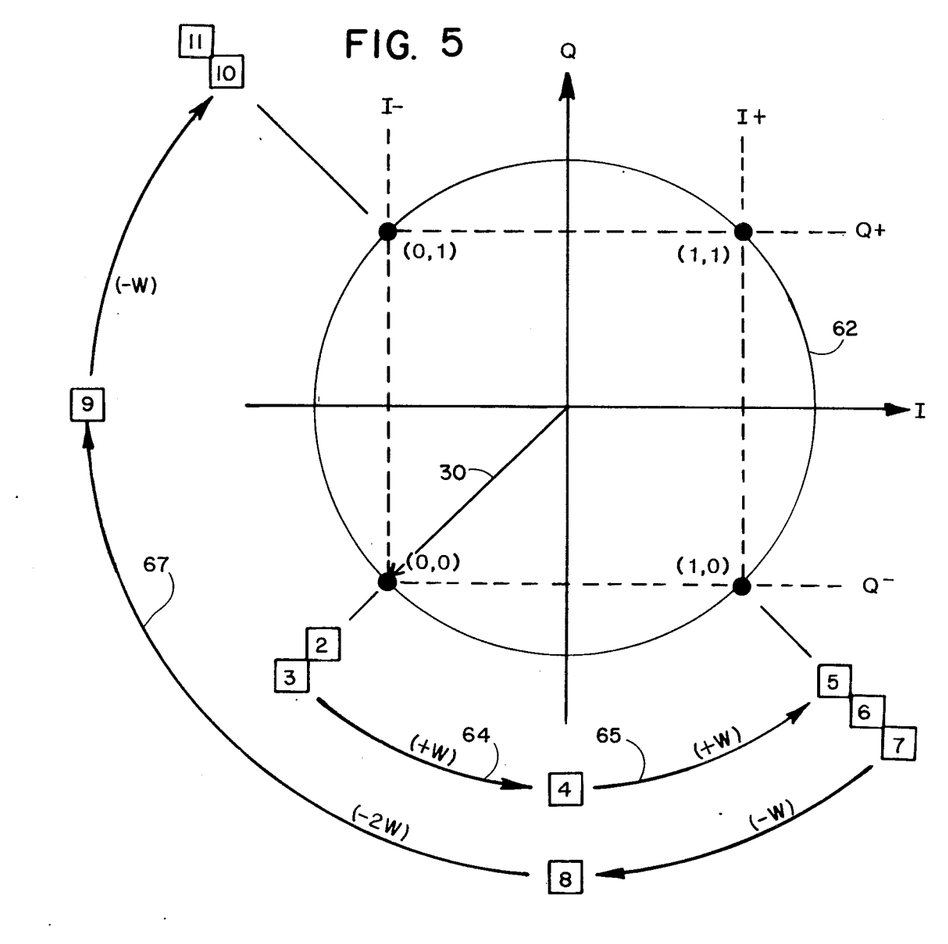
FIG. 5 is a vector diagram illustrating how the amplitude or end point of a modulated carrier vector signal or phasor on line 30 moves along a circle 62, which is a constant envelope or amplitude path, as a function of the input data 10 in FIG. 2.
Figure 6:
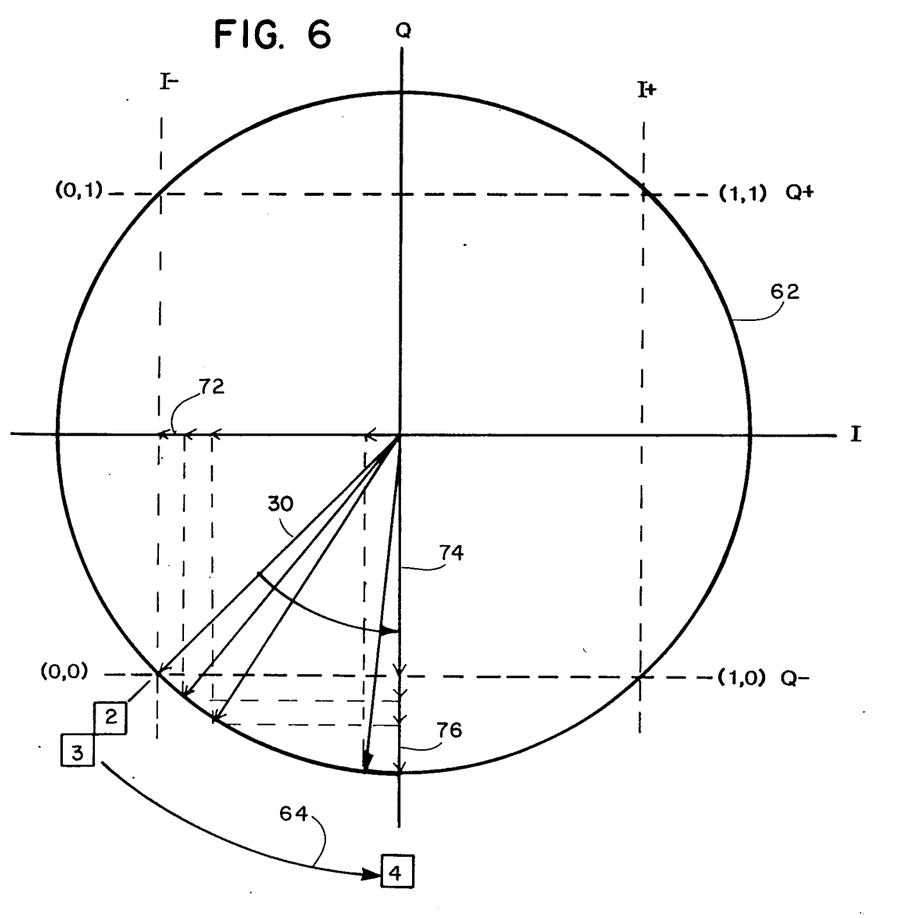
FIG. 6 is a phase diagram illustrating in more detail how the vector sum of the I and Q channel signals on lines 27 and 28 maintain a substantially constant envelope/amplitude as the phasor 30 moves in accordance with the coding rules of this invention.

Associated memory blocks in the two ROMs have a plurality of memory locations containing digital code words that represent voltages for the associated I and Q components for moving the signal vector relatively smoothly along circle 62 in FIGS. 5 and 6, i.e., from one phase position to another phase position that is no more than 90° away from the former. These code words which are in associated pairs of memory blocks in the two ROMs are utilized to specify the amplitudes of the outputs from the D/A converters, which define the amplitude of the I and Q components, respectively. The sum of the I and Q components defines the output phase vector of the modulator over the given symbol interval (e.g., between times t1-t2, t2-t3, etc.), i.e., the magnitude of the phasor and the rate and direction of its trajectory during a symbol interval. The counter 35 is responsive to clock timing pulses on line 32 during each symbol interval for producing a sequence of 5 bit words on line 36 which step through the look-up tables of addressed memory blocks of the two ROMs (i.e., 32 possible steps). The clock timing pulses on line 32 are at a rate N times faster than the data rate, where N is not greater than 32. In a particular embodiment N=24. As a result, only 24 of the 32 memory locations in each memory block are accessed in this implementation. Unused ones of the 32 memory locations are stepped over by the clocking. This produces a sequence of multi-bit digital words on ROM output lines 23-24. In order to move the vector 30 in FIG. 6 at a constant velocity between allowable positions there, the difference between adjacent code words in a particular block of memory is preferably a constant which may be 0.

The number of bits for the ROM output words on lines 23-24 is actually dependent on the desired accuracy of the associated analog voltages on lines 27-28 and the number of steps or memory locations in each memory block. In a system that was built and operated, 8 bit words were generated on lines 23-24 and each memory block contained only 24 memory locations (steps). The digital-to-analogue converters 25-26 used only the 6 most significant bits of the 8 bit word generated by the ROMs 21-22. Although the contents of memory locations are repeated in different memory blocks, the sequence of code words in each memory block is unique. This can be seen by considering the I and Q components of the vector 30 in FIG. 6 as it moves about the constant envelop circle 62 there.

The code words from the ROMs are converted to associated analog voltages by circuits 25-26. The converters 25 and 26 are preferably linear and provide outputs which are symmetrical about 0. They can readily be specified by a few points or digital words from associated memory locations. Three of these points are:

00(H): produces a maximum negative amplitude output from the converters,

7E(H): produces a 0 amplitude output from the converters, and

FC(H): produces a maximum positive amplitude output from the converters (where (H) here designates a hexidecimal number). The actual amplitude range of the output voltage depends on the particular D/A converter that is selected and is irrelevant to the modulation scheme itself. In practice it is about ±100 millivolts. The magnitude of the output voltage from the converters for an arbitrary hexadecimal (H) number is found by inter-polating between the above points. For example, if given the hexadecimal number 3F, which is exactly halfway between 7E (0 amplitude) and 00 (maximum negative amplitude), the output voltage of the converters would be 0.5 times the maximum negative amplitude.

Figure 9:
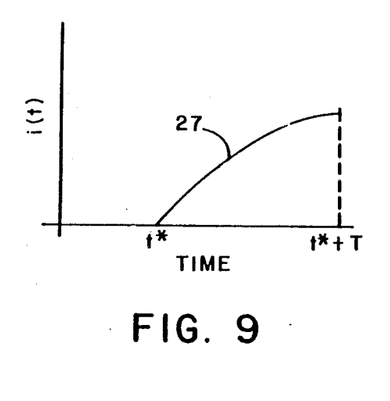
FIG. 9 is a graphic representation of an ideal analog signal 27 that is required on line 27 for a perfectly constant amplitude phasor signal 30.
Figure 10:
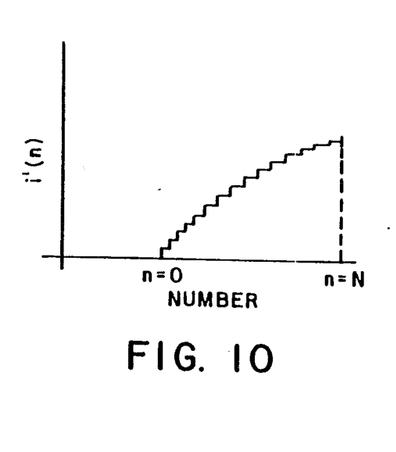
FIG. 10 is a graphic representation of the corresponding analog voltage 27 for the digital system in FIG. 1.

The I channel signal i(t) for a fully analog system and a digital system having an infinite number of digital steps or words defining the phase trajectory is smooth as is shown in FIG. 9. In a digital system, however, the corresponding signal i'(n), for n=0−N, has a granularity defined by the number N of steps or digital words used to traverse the trajectory (see FIG. 10). In an embodiment of this invention that was built and successfully operated, each memory block contained 24 distinct memory locations. There was no significant measurable noise or adjacent channel symbol interference in this structure.

The pair of quadrature-phase signals from converters 25-26 are combined with a pair of quadrature-phase sinusoidal carrier signals in product modulators 55-56 of the quadrature modulator 29. The product signals are summed in a combining circuit 59 for producing the sinusoidal phase modulated carrier signal or phasor 30 of the form sin ($\omega_c t + \phi(t)$) on line 30.

Figure 11:
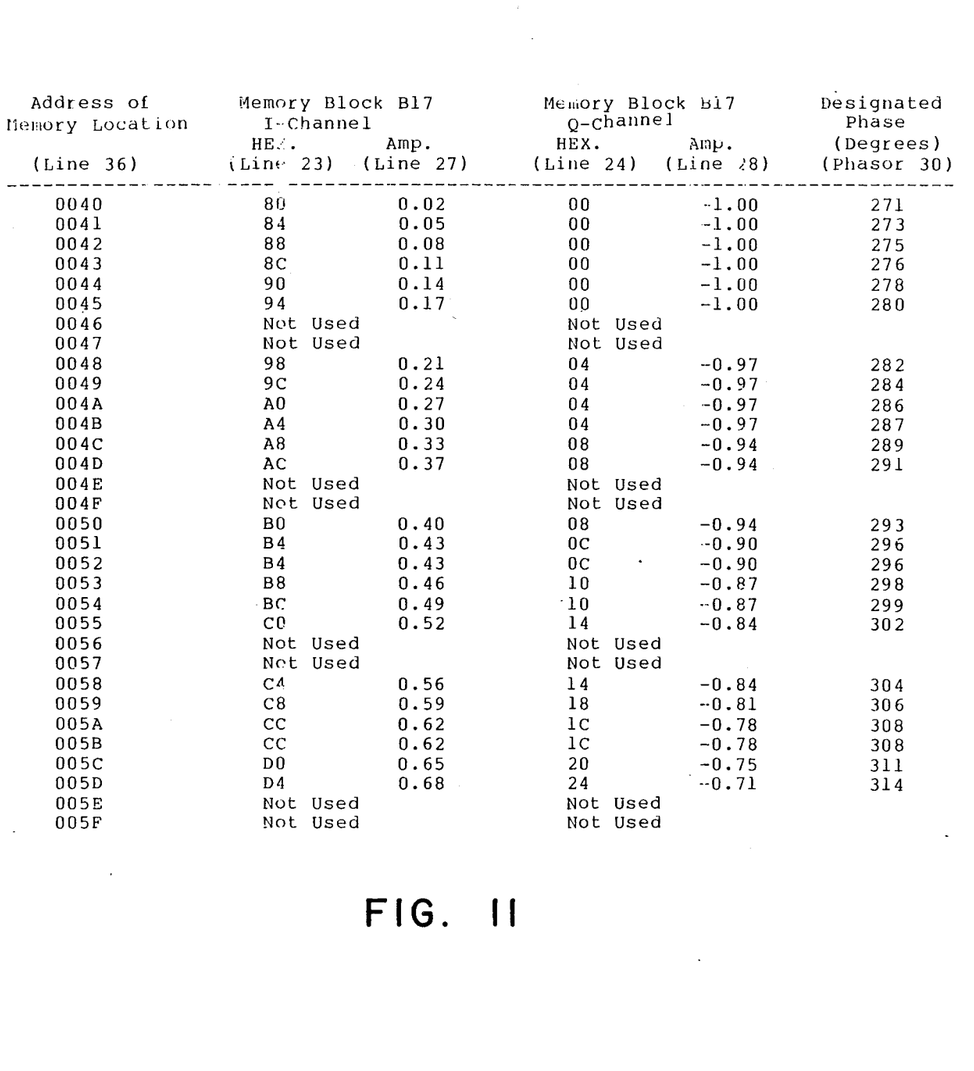
FIG. 11 is a tabulation of the contents of memory blocks B17 of ROMs 21 and 22 for a phase shift of $+45°$ from $+270°$ to $+315°$.

In order to move the vector 30 in FIG. 6 at a constant velocity between allowable positions there, one and other of the I and Q components 72 and 74 must increase and decrease at prescribed rates. By way of example, the code words in blocks B17 (Row 17 of FIG. 4) of the ROMs 21 and 22 and associated analog voltages from converters 25-26 for moving the phasor +45° from +270° to +315° are shown in FIG. 11. The code words in the memory blocks B10 (Row 10 of FIG. 4) for moving the phasor −45° from +351° to +270° are switched and are the reverse of (i.e., occur in the opposite order to) those in FIG. 11.

Referring now to FIG. 11, the information Q(t−2T)=0, Q(t)=0, I(t−2T)=0, I(t)=1, and baud clock=0 selects blocks B17 of memory in the ROMs. Column 1 in FIG. 11 represents digital words (in hexidecimal) from counter 35 which step the ROMs through the contents of memory blocks B17. Columns 2 and 4 represent the contents of prescribed memory locations within memory blocks B17, for the I and Q channels, and columns 3 and 5 represent the amplitudes of corresponding analog signals from converters 25-26. Column 6 represents the phase of the resultant signal vector 30 in FIG. 6 for these contents of the associated memory locations.

It can be determined that the phase angle progresses uniformly from +270° to +315° as desired. Although the data in FIG. 11 includes some round-off errors, these would not necessarily occur in practice where a larger number of digits are employed. Also, there appears some granularity in the output voltages of the converters as is expected from a finite number of samples.

In accordance with another aspect of this invention, the phase of the signal vector or phasor 30 is dictated by the input data according to the following unique set of rules which data in the ROMs satisfy:

1. The phase of the modulated signal vector or phasor 30 is continuous.

2. The phase trajectory of the vector is determined by the baud clock and present and prior bit values in the two channels.

3. The rate of change of phase is determined as follows:

| I(t) = I(t − 2T) | Q(t) = Q(t − 2T) | \|w\| |
|---|---|---|
| yes | yes | 0 |
| yes | no | W |
| no | yes | W |
| no | no | 2W | where, w is the phase volocity or rate of change of phase, W and 2W are constant phase velocities that will rotate the phasor 30 a total of $\pi/4$ and $\pi/2$ radians in one bit time T, and I(t−2T) in waveform 14 is between t6 and t7 for a current I(t) between t8 and t9.

4. The direction of rotation of the phasor 30 depends on whether the I or Q-data stream was most recently updated, i.e., whether the present time t is associated with an odd or even numbered data bit in the input data stream, where each channel is updated during each baud time interval of 2T and the two channel signals are offset from each other by one bit time T. By way of example, the Q channel signal is most recently updated between times t4 and t5 when BC=0 in FIG. 2. In contrast, the I channel is most recently updated between times t3 and t4 when BC=1. Thus, the logic level of the baud clock defines which one of the I and Q channels was most recently updated.

The direction of rotation of the phasor 30 is determined as follows:

(a) Where the I channel is updated most recently (i.e., the baud clock is high):

| I(t-2T) = Q(t) | direction of rotation |
|---|---|
| no | −(clockwise) |
| yes | +(counterclockwise) |

(b) Where the Q channel signal is updated most recently (i.e., BC is low):

| I(t) = Q(t−2T) | direction of rotation |
|---|---|
| no | +(counterclockwise) |
| yes | −(clockwise) |

5. Allowable phases of phasor 30 at the end or beginning of bit intervals are n45°, where n is an integer (n = 0,1, ... 8).

6. Allowable phase changes within a symbol interval T are:

| Δϕ | FROM |
|---|---|
| 0° | p45°, where p = 1,3,5,7 (45°, 135°, 225°,315°) |
| ±45° | n45°, where n = 0,1, ... 8 |
| ±90° | m45°, where m = 0,2,4,6 (0°, 90°, 180°, 270°) |

The operation of the modulator in FIG. 1 will now be described for the input data signal 10 in FIG. 2 in accordance with these rules. First consider a time interval in which binary data is unchanging in both of the I and Q bit streams for a period of several bits. Such a situation is represented at the beginning of the data stream in FIG. 2, prior to the time t2 there. The data in each of the I and Q bit streams then, for both the present and immediate past bits, is 0. In accordance with rule 3, row 1, the phasor will remain stationary at one of the rest points, e.g., (0,0) at +225° in FIG. 5 (rows 1-2 of FIG. 4). Thus; the phasor is at +225° at time t2 and at time t3 (one bit interval later) as represented by the boxed numerals 2 and 3 in FIG. 5.

In the next bit period, the odd numbered bit D3 goes high at time t3 for updating the I channel while the signal level in the Q channel is held low. Consideration of the I and Q-data signals at this time reveals that I(t)≠I(t−2T) now, i.e., between times t3-t4 and t1-t2, respectively, but that Q(t)=Q(t−2T)=0. This means that there is a 45° change in the phase of the phasor in accordance with rule 3, row 3. And since the I channel is most recently updated at t3 and now I(t−2T)=Q(t)=0, the phasor is rotated in the counterclockwise direction from its rest position in accordance with rule 4(a), row 2. This is shown in FIG. 5 as the arrow 64 drawn from position 3 to position 4, i.e., from 225° to 270° (row 17 of FIG. 4).

For the next data bit D4 starting at time t4, it will be noted that this data bit is again low during updating of bit Q2 for the Q channel so that now I(t−2T)≠I(t) whereas Q(t−2T)=Q(t)=0. This again specifies a 45° phase change in accordance with row 3 of rule 3. And since BC=0 and I(t)≠Q(t−2T) for D4, then the phasor is again rotated 45° counterclockwise in accordance with row 1 of rule 4(b) (row 17 of FIG. 4). This is represented in FIG. 5 by the arrow 65.

Figure 4:
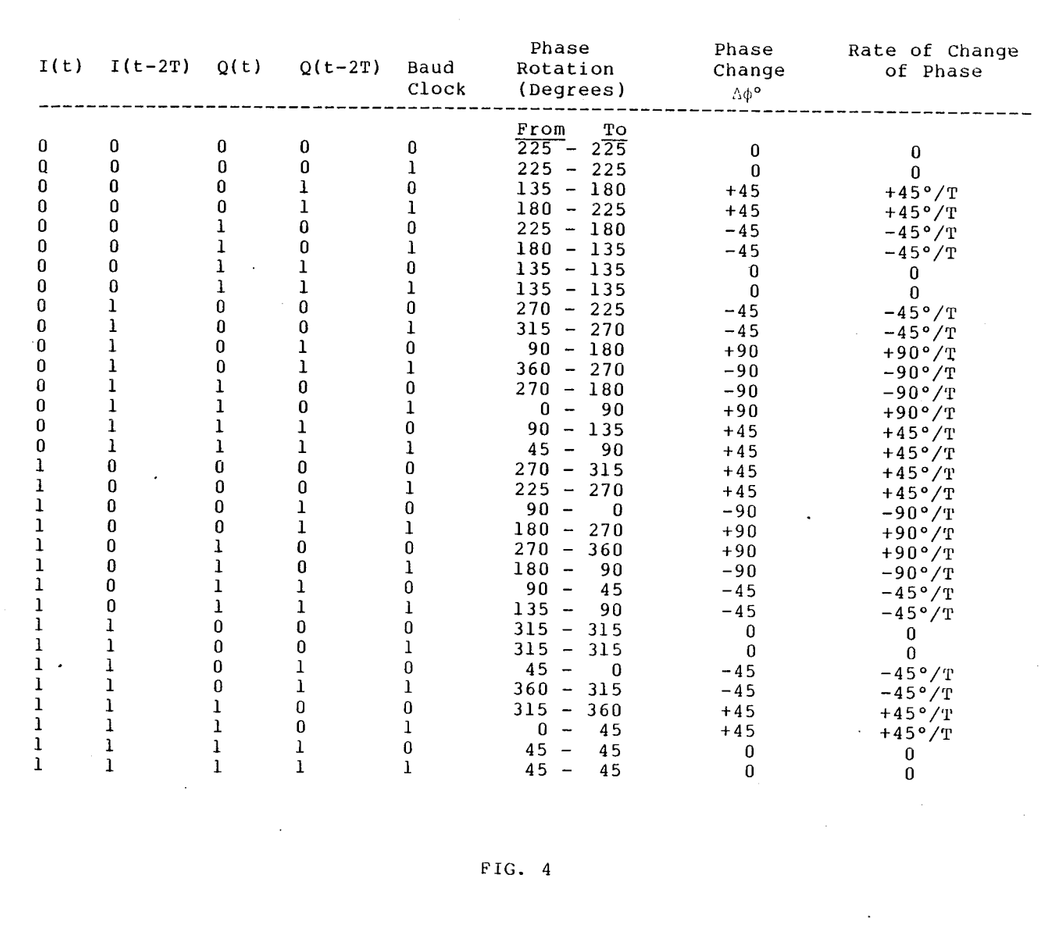
FIG. 4 is a tabulation of the code rules and associated phase changes for one embodiment of this invention.

During the next two data bits D5 and D6 between times t5 and t7, the contents of the I and Q-data channels are unchanged so that the phasor remains at the previously established rest point (1,0) in FIG. 5 which was previously established by the movement to position 5 (rows 25 and 26 of FIG. 4). During the next data bit D7, however, only the I channel changes state. This causes a 45° phase change in accordance with row 3 of rule 3. But in this instance the phasor rotates in the clockwise direction as specified by row 1 of rule 4(a) (row 10 of FIG. 4). The phasor therefore moves from position 7 to position 8 in FIG. 5.

Since the next data bit D8 is even numbered, the Q channel is updated and changes state. In this instance, however, I(t−2T)≠I(t) and Q(t−2T)≠Q(t). This condition calls for a maximum phase change of 2W=90° in accordance with row 4 of rule 3, with the trajectory or rotation of the phase vector being clockwise in accordance with row 2 of rule 4(b) (row 13 of FIG. 4). This is represented by the arrow 67 in FIG. 5. This phase shift of −90°=$\pi/2$ radians is the maximum phase shift that will occur between a starting position and an ending position for the phase vector during one symbol interval of duration T. This operation is also specified by FIG. 4.

In the preceding discussion it is apparent that there are eight positions to which the phase vector may move, four of which are the rest positions (0,0; 0,1; 1,0; and 1,1). The amplitudes or absolute values of the I and Q components of the phasor are equal at these rest positions, e.g., arrows 72 and 74 in FIG. 6 for the rest point (0,0). At other allowable locations, (at the start and end of each interval), however, if the Q amplitude is 1 then the I amplitude is 0 and vice versa, e.g., arrow 76 in FIG. 6. It will be recognized, however, that the amplitudes of the I and Q components may be either positive or negative ($\pm$I and $\pm$Q) and vary as a function of time as the counter 35 steps through the contents of associated blocks of ROM (see FIG. 6), where the vector sum of these components is always unity (on the constant amplitude circle 62). If one takes the amplitude of the phase vector 70, for example, in FIG. 6 as being equal to unity at the rest state (0,0), then the absolute values of the associated I and Q components 72 and 74 are $-0.707$.

Figure 3:
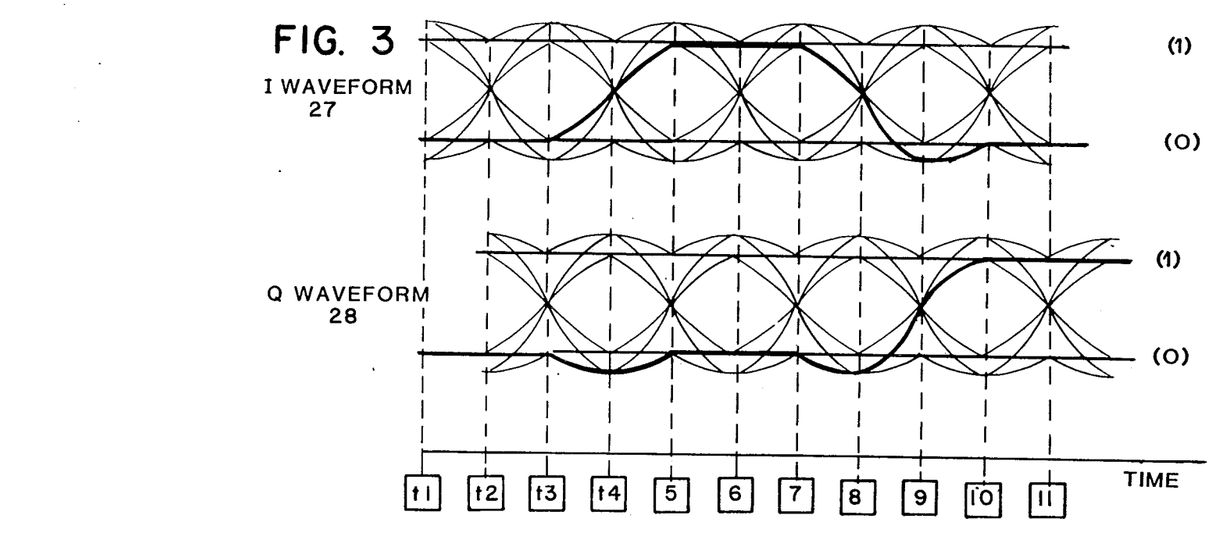
FIG. 3 is eye patterns appearing on lines 27 and 28 of the I and Q channels, the heavy lines therein corresponding to associated signals for the input data signal 10 in FIG. 1.

The variation in the I and Q components of the signal phase in FIG. 6 are plotted in associated waveforms in FIG. 3. When the upper and lower horizontal lines in the I and Q waveforms of FIG. 3 are considered to be $+0.707$ and $-0.707$, respectively, then it is readily seen that the heavy lines there specify the amplitude of associated vector components for the input data signal 10 in FIG. 2. The times at which one of the I and Q components of a phasor are of full value, i.e., unity in this example, are the boxed positions 4 and 8 for the Q waveform 28 where I=0; and is the position 9 at time t9 for the I waveform 27 when Q=0.

In order to insure that the amplitude of the phasor is constant as it shifts from one starting location to the next, it is necessary that the I and Q-data component amplitudes from the ROMs be such as to always provide a vector sum which falls on the constant amplitude location as represented by the circles 62 in FIGS. 5 and 6. In FIG. 6, an example of the signal vectors trajectory between locations 3 and 4 of FIG. 5 is shown and a few of the component values for the I and Q channels are illustrated. The granularity of the circle in an actual embodiment depends on the number of steps in each memory block of the ROMs (see FIG. 10).

In the system in FIG. 1, the I(t) and Q(t) output waveforms on lines 26–28 are constructed as a series of discrete time samples which are equally spaced in time by an arbitrary multiple of the bit rate. The accuracy of the discrete waveform is entirely dependent on the time resolution and the amplitude resolution (stored as discrete values in ROM), whose values are up to the user's discretion. In the limit, the resolution of the discrete waveforms may be said to exactly represent the desired waveforms. By referring back to the rules, it will be understood that the beginning and ending voltages for both the I and Q channels are established by the present and past bits for each channel, taken in combination.

Although this invention has been described in relation to preferred embodiments thereof, variations and modifications will occur to those skilled in the art. By way of example, the rules and contents of the ROMs may be modified for operation of an 8 phase, 16 phase, etc. system. Also, the baud clock means 33 may be driven by an output of the counter 35 for generating the baud clock signal. Further, the input data signal 10 may comprise parallel data. Additionally, the rules and contents of the ROMs may be modified so as to operate in a system where the serial input data signal is applied to a serial shift register with a plurality of bits thereof being provided to each of the ROMs. The scope of this invention is therefore to be determined from the appended claims rather than from the aforementioned detailed descriptions of preferred embodiments thereof.

What is claimed is:

1. Apparatus for transforming a serial input data signal into a substantially constant envelope offset phase shift keying modulated signal vector, comprising:

first means for generating a baud clock having a repetition rate that is one-half that of the data signal;

second means for directing alternate data bits in the input data signal into in-phase and quadrature-phase I and Q pulse trains, with the present data bit that is entered into a pulse train being held constant for the time interval 2T of the present and next data bits which have a symbol interval T;

storage means for storing a present and past bit for each of the I and Q pulse trains;

a quadrature-phase modulator for combining quadrature-phase sinusoidal carrier signals with associated ones of first and second input signals for generating the phase modulated signal vector; and third means responsive to the baud clock and the present and a prior bit from each of the I and Q pulse trains during each symbol interval for generating associated series of analog voltages which are said first and second input signals and which cause the rate of change w of the phase of the signal vector during each symbol interval to satisfy the criteria:

| $I(t) = I(t - nT)$ | $Q(t) = Q(t - nT)$ | $\|w\|$ |
|---|---|---|
| yes | yes | 0 |
| yes | no | W |
| no | yes | W |
| no | no | 2W | where W and 2W are constant phase velocities that rotate the signal vector a total of 45° and 90°, respectively, in a symbol interval; n is an integer; t is time; I(t) and Q(t) are the present bits; and I(t$-$nT) and Q(t$-$nT) are prior bits in the I and Q pulse trains; wherein n=2 and I(t$-$2T) and Q(t$-$2T) are the bits immediately preceeding the present bits in the I and Q pulse trains; and wherein said series of voltages from said third means cause rotation of the signal vector either clockwise or counterclockwise when the baud clock is one of a binary 1 and 0 and the bit I(t$-$2T) is not equal to and is equal to the bit Q(t), respectively; and rotation of the signal vector either counterclockwise or clockwise when the baud clock is the other of a binary 1 and 0 and the the bit I(t) is not equal to and is equal to the bit Q(t$-$2T), respectively.

2. Apparatus according to claim 1 wherein said third means comprises:

a pair of digital to analog converters having output signals which are said input signals to said modulator;

timing means providing a plurality of stepping pulses during each symbol interval; and first and second read only memories comprising blocks of memory that contain a plurality of digital words, each of said memories being responsive to the baud clock and binary indications of the present and past I and Q bits from said storage means for selecting a prescribed block of memory and responsive to the stepping pulses for outputting a series of digital words that are applied to an associated converter for producing a series of analog voltages, said voltages from said converters causing the direction and rate of change of the phase of the signal vector to satisfy the prescribed criteria.

3. A method of generating a constant envelope offset phase shift keying modulated signal vector from a digital input data signal in which alternate bits are directed into in-phase I and quadrature-phase Q channels, with the current bit that is entered into each channel being held constant for a time interval 2T of the current and next data bits, and wherein the phase of the signal vector varies by prescribed amounts and in prescribed directions during a symbol interval T of each data bit, comprising the steps of:

causing the rate of change w of phase to be determined as follows:

| $I(t) = I(t - 2T)$ | $Q(t) = Q(t - 2T)$ | $|w|$ |
|---|---|---|
| yes | yes | O |
| yes | no | W |
| no | yes | W |
| no | no | 2W | where $I(t)$ and $Q(t)$ represent the current data bits in the in-phase and quarature-phase channels, respectively; $I(t-2T)$ and $Q(t-2T)$ represent the immediate past data bits in the in-pase and quadrature-phase channels, respectively; $I(t)=I(t-2T)$ and $Q(t)=Q(t-2T)$ are identities; w is the phase velocity or rate of change of phase; and W and 2W are constant phase velocities that will rotate the signal vector a total of 45° and 90°, respectively, in one bit time T;

generating a baud clock signal having a repetition rate which is one-half that of the input data signal; and performing one of the steps of:

rotating the signal vector either counterclockwise or clockwise when the baud clock is one of a binary 1 and 0 and the identity $I(t-2T)=Q(t)$ is satisfied and not satisfied, respectively; and rotating the signal vector either clockwise or counterclockwise when the baud clock is the other of a binary 1 and 0 and the identity $I(t)=Q(t-2T)$ is satisfied and not satisfied, respectively.

4. The method accordint claim 3 wherein each bit time T is divided into a plurality N of steps and the incremental change of phase for each step is 90°/N when neither of the identities in claim 1 is satisfied, i.e., row 4 there.

5. The method according to claim 3 wherein each bit time T is divided into a plurality N of steps and the incremental change of phase for each step is 45°/N when only one of the identities in claim 1 is satisfied, i.e., rows 2 and/or 3 there.

6. The method according to claim 4 wherein the phase of the modulated signal is continuous.

7. Apparatus for transforming a serial input data signal into a substantially constant envelope offset phase shift keying modulated signal vector, comprising:

first means for generating a baud clock having a repetition rate that is one-half that of the data signal;

second means for directing alternate data bits in the input data signal into in-phase and quadrature-phase I and Q pulse trains, with the present data bit that is entered into a pulse train being held constant for the time interval 2T of the present and next data bits which have a symbol interval T;

storage means for storing a present and past bit for each of the I and Q pulse trains;

a quadrature-phase modulator for combining quadrature-phase sinusoidal carrier signals with associated ones of first and second input signals for generating the phase modulated signal vector; and third means comprising a memory means that is responsive to the baud clock and to address defined by the stored present and a prior bit from each of the I and Q pulse trains during each symbol interval for generating associated series of analog voltages which are said first and second input signals and which cause the rate of change w of the phase of the signal vector during each symbol interval to satisfy the criteria:

| $I(t) = I(t - nT)$ | $Q(t) = Q(t - nT)$ | $|w|$ |
|---|---|---|
| yes | yes | O |
| yes | no | W |
| no | yes | W |
| no | no | 2W | where W and 2W are constant phase velocities that rotate the signal vector a total of 45° and 90°, respectively, in a symbol interval; n is an integer; t is time; $I(t)$ and $Q(t)$ are the present bits; and $I(t-nT)$ and $Q(t-nT)$ are prior bits in the I and Q pulse trains.

8. Apparatus according to claim 7 wherein $n=2$ and $I(t-2T)$ and $Q(t-2T)$ are the bits immediately preceeding the present bits in the I and Q pulse trains.

9. In a method of generating a constant envelope offset phase shift keyed modulated signal vector from a digital input data signal in which alternate bits are directed into in-phase I and quadrature-phase Q channels, with the current bit that is entered into each channel being held constant for a time interval 2T of the current and next data bits, and wherein the phase of the signal vector is varied by prescribed amounts and in prescribed directions during a symbol interval T of each data bit in response to signals produced in the I and Q channels, the improvement comprising the step of causing the rate of change w of phase to be determined as follows:

| $I(t) = I(t - 2T)$ | $Q(t) = Q(t - 2T)$ | $|w|$ |
|---|---|---|
| yes | yes | O |
| yes | no | W |
| no | yes | W |
| no | no | 2W | where $I(t)$ and $Q(t)$ represent the current data bits in the in-phase and quadrature-phase channels, respectively; $I(t-2T)$ and $Q(t-2T)$ represent the immediate past data bits in the in-phase and quadrature-phase channels, respectively; $I(t)=I(t-2T)$ and $Q(t)=Q(t-2T)$ are identities; w is the phase velocity or rate of change of phase; and W and 2W are constant phase velocities that will rotate the signal vector a total of 45° and 90°, respectively, in one bit time T.

* * * * *